Jan. 5, 1960 J. O. PREISIG 2,920,133
COLOR TELEVISION
Filed June 14, 1954 3 Sheets-Sheet 1
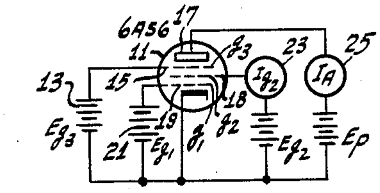
Fig_1
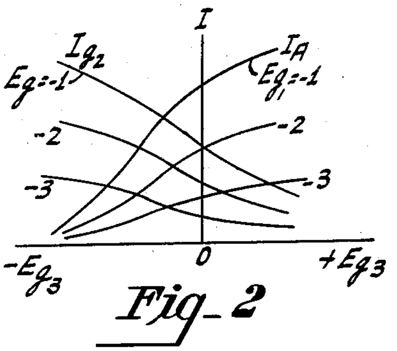
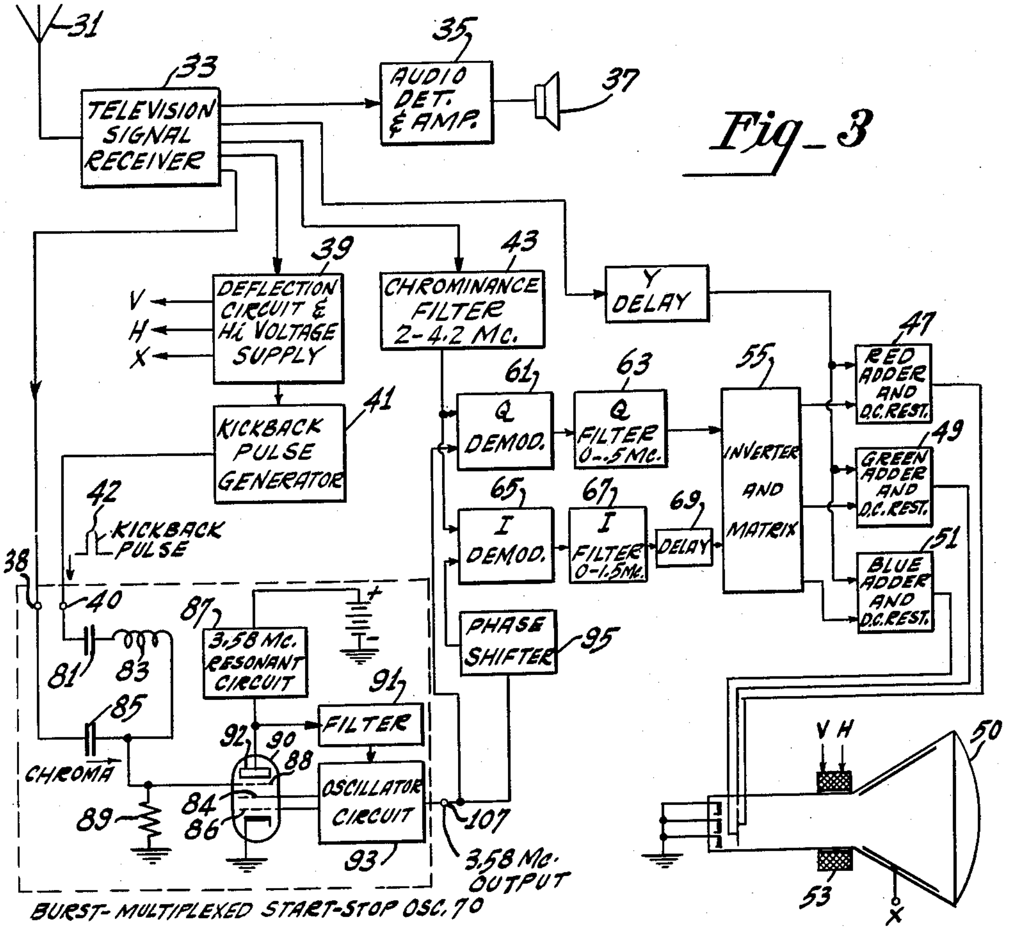
INVENTOR.
JOSEPH O. PREISIG
BY [signature]
ATTORNEY INVENTOR.
JOSEPH O. PREISIG
BY
[signature]
ATTORNEY Jan. 5, 1960 J. O. PREISIG 2,920,133

COLOR TELEVISION

Filed June 14, 1954 3 Sheets-Sheet 3

INVENTOR.
JOSEPH O. PREISIG
BY
[signature]
ATTORNEY

United States Patent Office

2,920,133

Patented Jan. 5, 1960

2,920,133

COLOR TELEVISION

Joseph O. Preisig, Trenton, N.J., assignor to Radio Corporation of America, a corporation of Delaware Application June 14, 1954, Serial No. 436,570

18 Claims. (Cl. 178—5.4)

The present invention relates to synchronizing circuits and switching circuits, and more particularly to color synchronizing and switching circuits of the type employed in color television receivers.

Color television provides the reproduction on the viewing screen of the receiver of not only the relative luminescence and brightness but also the color hues and saturations of the color details in the original scene. Complete cooperation between the transmitter and receiver is essential in the successful operation of a television system. As a result, much emphasis is placed on the development and utilization of synchronizing methods. This is particularly true in color television wherein not only is it necessary to maintain accurate deflection scanning but also it is necessary to maintain accurate synchronism in the timing of the color selection.

The electrical transfer of images in color may be accomplished by additive methods. Additive methods produce natural color images by breaking down the light from an object into a predetermined number of selected primary or component colors. Component colors may then be transferred electrically by analyzing the light from an object into not only its image elements, as is accomplished by normal scanning procedure, but also by analyzing the light from elemental areas of the image into selected primary or component colors and deriving therefrom a signal representative of each of the selected color components. The color image may then be reproduced at a remote point by appropriate reconstruction from a component color signal train.

Consider now some of the salient details of the color television signal which conforms to standards which were authorized by the Federal Communications Commission on December 17, 1953. These standards describe a component waveform which contains both the luminance information and the chrominance information relative to the transmitted color image in addition to synchronizing information which is necessary for proper synchronization of the deflection circuits of the receiver and the transmitter and also for proper synchronization of the color circuit of the receiver.

In order that the need for synchronizing and switching circuits which employ the teachings of the present invention may be more clearly understood and appreciated, consider first some of those aspects of the transmission of a color television picture which bear upon the present invention. The color television picture is resolved into a set of four different types of signals in addition to a fifth signal which constitutes the sound information. One of these component television signals is, as has been previously described, the synchronizing signal which synchronized the deflection circuits of the receiver with the information which is being transmitted. A second component color television signal is termed the luminance or monochrome information. This information corresponds to the information which is normally transmitted for the monochrome image in black-and-white transmission. When considered in terms of its use in the transmission of color television information it is important to realize that the luminance or monochrome signal is actually formed by a combination of three primary color signals. It has been found that the component color signals, namely red, green, and blue which are used in color television do not appear equally bright because they are located in different parts of the spectrum and hence stimulate the brightness sensation by different amounts. However, if the three primaries are mixed in right proportions, it has been found that the green primary which is located at the center of the visible spectrum accounts for 59% of the brightness sensation, while the blue primary accounts for 11% of the brightness sensation while the red primary accounts for 30% of the brightness sensation. It then follows that it is possible to evolve a monochrome component color television signal by cross-mixing red, blue, and green primary signals according to the proportions 59% green, 30% red, and 11% blue. This resultant signal is termed the monochrome or luminance signal, or, symbolically the Y signal. This signal is generated in accordance with existing scanning standards; i.e. 525 lines, 60 fields per second, and 30 frames per second, and should be treated exactly like a standard monochrome signal with respect to bandwidth and the addition of synchronizing and blanking pulses.

The third type of signal included in the color television signal is termed the chrominance signal. This is a color modulated subcarrier, the subcarrier having a frequency of approximately 3.58 mc. This color modulated subcarrier is modulated in a manner to be described in the succeeding paragraph by two color difference signals. Color has only three variables in the particular system which is employed for color television transmission. In order that the color information representing these color variables be made suitable for transmission it has been convenient to establish what are termed chrominance signals, namely color-difference signals which are designated as R—Y, G—Y, and B—Y signals which indicate how each color in the televised scene differs from the monochrome color of the same luminance. Since these color-difference signals are actually interrelated, it is not necessary to send three color-difference signals but actually two color-difference signals since in the receiver by properly matrixing the two incoming color difference signals which are chosen for the transmission, the third color-difference signal may be formed by proper recombination of the two. For example in one type of transmission it would be possible to build a transmission network which transmits appropriate amounts of R—Y and B—Y signals. It can be shown that at the receiver G—Y signals can be formed by combining R—Y information and B—Y information according to the following amounts, namely $$-0.51\,(R-Y)-0.19\,(B-Y)$$

this combination then adding to give one unit of G—Y.

In the actual method of transmission which has been approved by the Federal Communications Commission it is actually convenient to employ another type of signal for the transmission. This second type of signal is made up of color-difference signals which make allowance for the acuity of the eye to various colors and is also more suitable for utilizing the 6 megacycle channel which is standard for monochrome picture signal transmission with its associated frequency modulated sound signal.

These two color difference signals are termed I and Q signals, the I signal being a wide band color-difference signal describing color information along principally the orange-cyan axis with the Q signal a relatively narrow band signal describing information along principally a green-purple axis.

Consider now the method of sending the I and Q signals on the color subcarrier. It is well known that a sine wave can carry two independent sets of information by modulating it in amplitude with one set and phase with the other, or, what is essentially the same thing, by separating the sine wave into two components in quadrature and amplitude modulating each component with one set of information. Each modulation can then be recovered by heterodyning the modulating wave with a sine wave having the same frequency and phase as the carrier component carrying the desired modulation. This process is sometimes called synchronous detection and must not be confused with other forms of detection which recover the modulation envelope.

Therefore in practical operation, a color subcarrier is used this color subcarrier being modulated using quadrature modulation by the I and Q signals respectively. It has been mentioned that the frequency designated for the color subcarrier is 3.58 mc. This is a frequency substantially equal to that of an odd multiple of one-half the line scanning frequency. Since the spectral components of a standard television signal occur in groups at intervals of line scanning frequency, by choosing the color subcarrier frequency at an odd multiple of one-half the line scanning frequency, the color information will be interspersed with that of the luminance and picture information and a minimum of signal confusion will result. In practice it is convenient to transmit the I and Q information on the color modulated subcarrier in the following manner. The I signal, which is the wide band signal having a bandwidth of from approximately zero to 1½ mc., is included with the color subcarrier in such a way that it produces double sideband information for modulating frequencies up to approximately ½ mc. and single sideband information for frequencies in approximately the range from ½ mc. to 1½ mc. The disposition of these side frequencies is such that the single sideband information is included in the video spectrum from approximately 2.2 mc. to 3 mc. The Q signal which is a narrow band chrominance signal is transmitted double sideband with modulating frequencies up to approximately ½ mc. This signal, is of course, easily included in the television picture channel, which is assigned a transmission band having an upper limit of approximately 4.2 mc. so that the sound carrier which is centered at 4½ mc. from the picture carrier can be included in the channel without interference or crosstalk with the picture information.

The precise method of impressing I and Q signals on the color subcarrier may be described in the following manner. It is not desirable to use two separate frequency interlaced carriers because the difference frequency between them would be an even multiple of one-half the frame frequency and hence there would be no tendency toward self-cancelling. The need for two carrier frequencies can be eliminated by the use of the two-phase modulation technique which is equivalent to the use of two carriers of the same frequency but with a phase separation of 90°. In the two-phase modulation technique, the I and Q signals which are independent signals are modulated on two carriers of the same frequency but 90° apart in phase. The outputs of the two modulator channels are then fed to a common transmission channel, that is, two modulated waves are simply added together. This type of color subcarrier transmission has the additional advantage in that when used with a balanced modulator, the color subcarrier itself is actually cancelled or suppressed thereby eliminating this particular frequency component which might cause kinescope rectification or moire effects, this particular frequency component not being useful for actually carrying picture information.

Perhaps one of the most important advantages of using the two-phase modulation technique involving the I and Q signals on the color subcarrier is the fact that not only is the I and Q signal information found in the color subcarrier but actually, there are many other types of color information which are contained in the sidebands of the modulated color subcarrier spectrum. The phase of the modulated color subcarrier then yields an indication of hue while the amplitude modulated subcarrier gives an indication of saturation. This has the added advantage of making possible the process of synchronous detection in the receiver which involves heterodyning of the color subcarrier with a locally generated subcarrier signal of proper phase; this heterodyning will then yield the color information at the particular phase at which the synchronous detection is taking place.

The precise phases of the I and Q signals and the hue signals of other types which are included in the color modulated subcarrier signal then are very critical if accurate reproduction or accurate color demodulation of the primary color information or color-difference information at the color television receiver is to be accomplished. In order that synchronous detection at precise phases can be accomplished at a remote receiver it is therefore necessary to transmit synchronizing information with the television signal. This synchronizing information is transmitted in the form of approximately 8 cycles of the 3.58 mc. color subcarrier, these approximately 8 cycles are located on the back porch of the horizontal synchronizing burst. The phase of this synchronizing burst is 57° ahead of the I signal which leads the Q signal by 90°. It can be shown also that the phase of the color synchronizing burst is 90° out of phase of the $R-Y$ signal with the $R-Y$ signal leading the $B-Y$ signal by 90°. The $G-Y$ signal lags the burst signal by 304.4°. Actually these are only a few of several hues which are represented in the color subcarrier as related to the phase of the color subcarrier, these hues running the gamut from yellow to red to purple to blue to cyan to green. It clearly follows therefore that in a reproducer which is to display color information, regardless of which type of signal or which group of signals is to be reproduced, accurate use must be made of the synchronizing information to produce properly synchronized locally generated continuous waves which can be used in the processes of synchronous detection.

There are many types of synchronizing signals which can be used in conjunction with a synchronizing burst in a color television receiver which can perform the process of synchronizing one or more local signal generators in the color television receiver whose output can be used in the process of synchronous detection of one or more color-difference signals. One of these methods is to use the method of automatic frequency control which involves the separation of the color synchronizing burst from the color television signal, with the utilization of this color synchronizing burst in a frequency and phase comparison device which compares the frequency and phase of the burst with the frequency and phase of the local oscillator. This frequency and phase comparison device then yields a correction signal which can be applied to a reactance tube which will synchronize the frequency and phase of the local oscillator accurately with respect to that of the color synchronizing burst. Still another method for synchronizing a local signal source with the color synchronizing burst is one involving injection locking; this involves the injection of the color synchronizing burst into an appropriate portion of the circuit of a free-running oscillator. It is well known that if the parameters of the oscillator circuit are correct and if the injection is performed in a proper portion of the oscillator circuit, then the oscillator will fall into synchronism at the phase of the color synchronizing burst. The injection lock method is particularly effective if the oscillator can be caused to stop and then start again under the influence of the color synchronizing burst.

The present invention teaches the use of a start-stop oscillator which can be caused to stop oscillating at the end of a scanning line and then, under the influence of a color synchronizing burst, to start again before the next line starts, in a phase which is that of the color synchronizing burst. This approach has actually been taught by the present inventor in his copending U.S. patent application entitled "Color Synchronization," bearing the U.S. Serial No. 391,800, filed November 13, 1953, now Patent No. 2,858,365, issued Oct. 28, 1958. The teachings associated with the present invention are intended to extend the teachings described by the present inventor in his aforementioned copending application in that an improved method of switching or multiplexing the color synchronizing burst into the local oscillator is described in addition to also providing means whereby improved phase and frequency stabilization of the start-stop oscillator is achieved thereby improving the action of the injection-lock process and also providing improvement in the process of synchronizing the phase of the start-stop oscillator with that of the color synchronizing burst.

It is therefore an object of this invention to provide an improved combined color burst gating circuit and color oscillator circuit.

It is yet another object of this invention to provide a combined gate and oscillator circuit.

It is yet another object of this invention to provide an oscillator circuit in which synchronizing signal gating can be provided.

It is still a further object of this invention to provide an injection-lock oscillator whose circuit includes the function of synchronizing burst gating.

It is yet a further object of this invention to provide a start-stop oscillator circuit whose electron tube is also utilized for gating a synchronizing burst.

It is still a further object of this invention to provide a start-stop injection-locked color oscillator in a color television receiver whose operation includes the function of color bust gating.

According to this invention an electron tube or control device is used which includes a control element which varies the output current between either of two output electrodes. A portion of the device involving one of the output electrodes is utilized as an oscillating circuit. A frequency and phase synchronizing device, designed to be responsive to a synchronizing signal is coupled to the other output electrode. This frequency and phase synchronizing device is coupled to the oscillating circuit. The synchronizing signal is then applied simultaneously with a gating signal to the control electrode whereby during the duration of the gating signal the oscillator is caused to be turned off and the synchronizing signal is gated to the frequency and phase synchronizing circuit which then passes this information to the oscillator circuit so that when the oscillator circuit resumes oscillating at the conclusion of the gating signal the synchronizing signal developed in the frequency and phase synchronizing circuit will cause the oscillator to resume oscillations in a predetermined frequency and phase as prescribed by the synchronizing signal. In addition the oscillating circuit is designed whereby it operates with improved frequency and phase stability.

In one form of the invention a pentode is used whose suppressor grid has the function of controlling the current which passes to either the anode or to the screen grid depending upon the potential of the suppressor grid. The control grid and the screen grid of the pentode are associated with an oscillatory circuit which is caused to produce oscillations. A color synchronizing burst is applied simultaneously with a gating signal to the suppressor grid in such a way that the oscillator circuit is caused to stop oscillating while the color synchronizing burst passes into the output circuit which is attached to the anode. This output circuit is in the form of a ringing circuit which is connected to the oscillator circuit whereby when the oscillator resumes oscillations following the end of the gating pulse the oscillator is caused to resume oscillations at the frequency and phase of the color synchronizing burst.

In another form of the present invention, the teachings described in the proceeding paragraph are extended whereby the resonant circuit of the oscillator is caused to have a phase versus frequency characteristic whereby the phase changes very slowly in the vicinity of the resonant frequency of the resonant tank circuit. In this way frequency and phase stability may be obtained in a manner which will enhance the overall operation of the color burst multiplexed start-stop oscillator.

Other and incidental objects and advantages of the present invention will become apparent upon a reading of the specification and an inspection of the accompanying drawings in which:

Figure 1 shows a basic circuit associated with a 6AS6 type pentode;

Figure 2 shows pertinent characteristics of a 6AS6 type of pentode;

Figure 3 shows a block diagram of a color television receiver which employs the present invention as a burst multiplexed start-stop oscillator;

Figure 4:
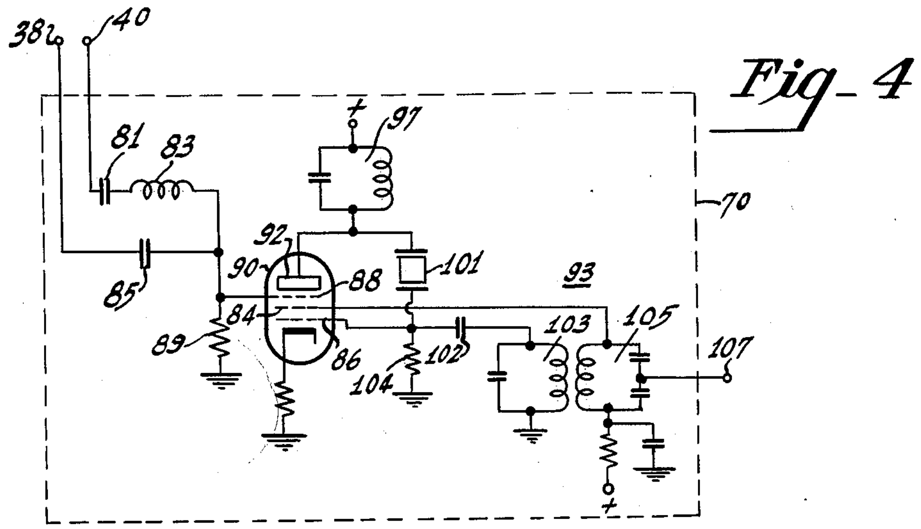
Figure 4 shows a schematic circuit embodying one form of the present invention.

Before entering upon a description of the present invention, consider first the operation of a tube of the 6AS6 type whose elements and whose circuit is shown in Figure 1. Figure 2 shows pertinent characteristic curves of this tube which teach concepts which are relative to the present invention. As is shown in Figure 1, a potential $E_{g3}$ is applied to the third grid 15 of the tube 11. Incorporated into the circuits of the anode 17 and the screen grid 18 are the plate current ammeter 25 and the screen grid current ammeter 23. The third grid 15 has a unique function in a tube of this type in that it acts to control the space charge distribution between the anode 17 and the screen grid 18; that is when the third grid 15 is made sufficiently positive the majority of the current is delivered to the anode 17 with only a small amount passing to the screen grid 18. When the potential of the third grid 15 is made sufficiently negative, however, the current to the anode is also reduced with the majority of the current then going to the screen grid 18; in fact for a sufficient reduction in the potential of the third grid 15, virtually all of the current will pass through the screen grid circuit with only a negligible amount of current, if any, reaching the anode 17. This behavior is shown graphically in Figure 2 as a function of the potential $E_{g3}$ where it is seen that as $E_{g3}$ is caused to be positive, the anode current $I_A$ increases with $I_{g2}$ decreasing. As $E_{g3}$ is caused to go negative, then the inverse happens with $I_{g2}$ increasing and $I_A$ decreases sharply. It clearly follows from the current characteristics that a tube of the 6AS6 type is actually a tube having two output circuits; one output circuit operates in conjunction with the anode and the other operates in conjunction with the screen grid 18. The third grid 15 is then a useful device for multiplexing signal information as developed within the tube 11 by the control grid 19 between the anode 17 and the third grid 18. This multiplexing operation will be seen to perform an important function in the teachings and the embodiments which will be described in the following specifications.

Consider now a block diagram of a color television receiver which utilizes the teachings of the present invention. In this receiver, I and Q signals are utilized for the production of color signals which are then caused to form the recovered color image on the color kinescope 50. It follows to one skilled in the art, however, that by suitable modification of the receiver to accommodate, for example, the direct demodulation of $R-Y$ and $B-Y$ signals, the change in the precise operation of the chrominance channels will in no way effect or detract from the teachings of the present invention.

In the color television receiver circuit shown in Figure 3 the incoming color television signal arrives at the antenna 31 and is impressed on the television signal receiver 33. This television signal receiver 33 combines the operation of mixing, intermediate frequency amplification and second detection, in a manner which has been described in chapter 22 of the book "Harmonics, Sidebands, and Transients in Communication Engineering," by C. Louis Cuccia as published by McGraw-Hill Book Co., Inc., in 1952. The output signal of the television receiver 33 then contains both the color television signal information and also the sound information which is transmitted on a sound modulated carrier, the frequency of the sound modulated carrier being 4½ mc. removed from the picture carrier frequency.

There are many methods for extracting sound information from the complete color television signal. One uses for example the well known principles of intercarrier sound; using this principle in conjunction with the audio detector and amplifier 35 the audio or sound information is extracted from the color television signal and applied to the loud speaker 37.

Consider now the four branches which utilize the color television signal information in a manner employing the teachings of the present invention. One branch involves the complete color television signal in view of its containing Y or monochrome information. This color television signal is passed through the Y delay line 45 and impressed simultaneously on the red adder and D.-C. restorer 47, the green adder and D.-C. restorer 49, and the blue adder and D.-C. restorer 51 to which will also be impressed the respective color different signals so that the component color signals may then be formed and impressed on appropriate control grids of the kinescope 50.

Another output branch of the color televsion signal receiver 33 applies the color television signal to the deflection circuits and high voltage supply 39. In these circuits, the deflection signals are produced which are applied to the yokes 53 so that scanning of the proper nature can be applied to the electron beam in the kinescope 50. In addition, the deflection circuits and high voltage supply 39 also supply high voltage which may be applied to the ultor of the kinescope 50. Another function of the deflection circuits and high voltage supply 39 is to drive the kickback pulse generator 41. The kickback pulse generator is usually produced in the nature of a winding on the transformer of the high voltage supply and is used to deliver a kickback pulse 42 during the blanking interval.

In another branch of the output of the television signal receiver 33 the color television signal is applied to the chrominance filter 43. The chrominance filter 43 has a pass band from substantially 2 to 4.2 mc. This has the effect of eliminating those luminance signal components in the spectral region from the lower frequency region of the color television picture up to approximately 2 mc. The resulting information, which is principally chrominance information, although some luminance components are involved, is then applied simultaneously to the Q demodulator 61 and the I demodulator 65.

The present invention is devoted to teaching an improved method for providing a locally generated signal which is accurately synchronized in phase and frequency by the color synchronizing burst. This invention is incorporated in the burst multiplexed start-stop oscillator 70. Assuming for the moment the accomplishment of the teachings of the present invention as embodied in the burst multiplexed start-stop oscillator 70, this oscillator is then employed to impress a synchronous detection signal directly to the Q demodulator 61, and by using the phase shifter 95, a synchronous detection signal of proper phase for I demodulation is applied to the I demodulator 65.

The Q demodulator 61 yields a Q signal at its output. This Q signal is applied through the Q filter 63 which has a pass band from 0 to ½ mc. The I demodulator 65 yields an I signal to the I filter 67 which has a pass band from approximately zero to 1½ mc. Since the pass bands of both the Q and the I filter are different it is necessary that the delay line 69 be included after the I filter 67 so that the time delay of the I information and the Q information may be made the same. The output of the Q filter 63 and the delay line 69 are then applied to the inverter matrix circuit 55 which yields $R-Y$, $G-Y$, and $B-Y$ signals which are applied respectively to the red adder and D.-C. restorer 47, the green adder and D.-C. restorer 49, and the blue adder and D.-C. restorer 51 at whose outputs red, green, and blue signals are produced which are applied to the appropriate control grids of the kinescope 50.

Consider now the operation of the burst multiplexed start-stop oscillator 70 which employs the teachings of the present invention. Note that a multigrid tube 90 is used. If this tube 90 has characteristics of the type described in connection with Figure 1, then the third grid 88 will be of the type that controls the space charge distribution between the anode 92 and the screen grid 84. It is to be noted that actually any type of electron control device whether electron tube or transistor may be used, provided that the particular type of operation as afforded by the grid 88 will be realized.

The oscillator circuit 93 is then coupled to the control grid 86 and the screen grid 84. A 3.58 mc. resonant circuit is coupled to the anode 92. Then the color television signal, signified as chroma information, is passed through the condenser 85 and applied to the third grid 88. At the same time the kickback pulse 42 is applied through the condenser, through the RF choke 83 whose function is to keep the kickback pulse circuit from short circuiting the chroma circuit, and then on to the third grid 88 so that these two signals are applied simultaneously. It is to be noted that differentiation of the kickback pulse 42 may be provided so that a portion of the differentiated kickback pulse will be caused to have a duration time substantially that of the color synchronizing burst.

The operation of the burst multiplexed start-stop oscillator 70 may then be described as follows. With the kickback pulse and the chroma applied simultaneously to the third grid 88, the third grid is raised sufficiently positive with respect to the screen grid 84 during the duration of the differentiated kickback pulse and the color synchronizing burst is then multiplexed to the anode 92 and into the 3.58 mc. resonant circuit 87 in which circuit oscillations at the frequency and phase of the color synchronizing burst are caused to occur. During this time, because of the space charge distribution action of the grid 88, the oscillator circuit 93 in conjunction with the screen grid 84 and the control grid 86 is caused to at least oscillate at a very reduced level, if not to cease oscillating entirely, depending upon the amount of feedback involved. At the conclusion of the differentiated kickback pulse the oscillator circuit is caused to start oscillating again because of the fact that the third grid 88 is biased to a very negative potential which is adequate to allow sufficient current to reach the screen grid 84 so that the oscillator circuit in conjunction with the grid 84 and control grid can then function once more to produce oscillations. However, with oscillations being produced also in the 3.58 mc. resonant circuit 87 at the frequency and phase of the color synchronizing burst, these oscillations in the 3.58 mc. resonant circuit 87 can be applied through a suitable filter 91 to the oscillator circuit to cause the oscillator circuit to start oscillating at the frequency and phase of the color synchronizing burst.

The precise action of synchronization may be one describable in terms of injection-locking principles which will be described further in the specifications. In order to injection-lock a free-running oscillator and particularly when this oscillator is about to start oscillating, it is necessary to inject a sufficient amount of synchronizing energy into either its grid or its cathode circuit so that upon attainment of its oscillation level, the oscillator circuit in conjunction with the tube 90, will then be oscillating at the frequency and phase of the color synchronizing burst.

It is to be noted however that the output of the 3.58 mc. resonant circuit 87 may also be applied to a suitable phase and frequency discriminator to which is also applied a signal from the oscillator circuit 93. If the frequency of the oscillator circuit is not that of the color synchronizing burst, then the phase and frequency discriminator circuit will produce an indication signal. This indication signal may be applied to a reactance tube which may be utilized to return the frequency and phase of the oscillator circuit 93 to that prescribed by the color synchronizing burst.

Figure 4 shows a more complete circuit of an embodiment of the present invention following from the system entitled "burst multiplexed start-stop oscillator" in Figure 3. In this circuit the principle of injection-locking is used rather than another approach using reactance tube automatic frequency control which has been mentioned. In this circuit the kickback pulse 42 is applied to the input terminal 40. The color television signal is applied to the terminal 38. The kickback pulse is differentiated by use of the resistor 89 and the condenser 81 and the differentiated kickback pulse, together with the color television signal, is applied directly to the third grid 88 of the tube 90. During the time of the color synchronizing burst, due to the action of the differentiated kickback pulse, the color synchronizing burst is multiplexed into the resonant circuit 97. At the time that the color synchronizing burst is multiplexed into the resonant circuit 97 the oscillator circuit is turned off. The oscillator circuit in the system of Figure 4 is seen to consist of the resonant circuit 103 which is coupled to the control grid 86 of the tube 90; this resonant circuit 103 is coupled to the resonant circuit 105 which is coupled to the screen grid 84 of the tube 90. This oscillator circuit is normally oscillating during the period time between kickback pulses. The action of the kickback pulse as applied to the third grid 88, as has been mentioned, causes this oscillator circuit in conjunction with the corresponding control grid of the tube 90 to either cease oscillation entirely or to oscillate at a level which is considerably lower than that at which it oscillates during a scanning line; following the conclusion of the differentiated kickback pulse, which is applied to the third grid 88, the oscillator then resumes oscillation. However because of oscillations produced in the resonant circuit 97 which is coupled to the anode 92 of the tube 90, these oscillations are transmitted through the piezo-electric filter crystal 101 to the grid circuit of the oscillator circuit 93. The injection of these oscillations through the piezo-electric crystal 101 into the grid circuit at the time when the oscillator circuit 93 is resuming oscillation causing the oscillator circuit to start oscillation at the frequency and phase of the color synchronizing burst. By proper design of the oscillatory circuit the oscillator will oscillate at this burst frequency and phase for the remainder of the scanning line following the color synchronizing burst until the next blanking period during which time the multiplexing action will both cause the oscillator circuit to stop oscillating and inject a color synchronizing burst into the resonant circuit 97 and then into the grid circuit of the oscillator circuit 93 which will resume oscillating once again following the differentiated kickback pulse.

Figure 5:
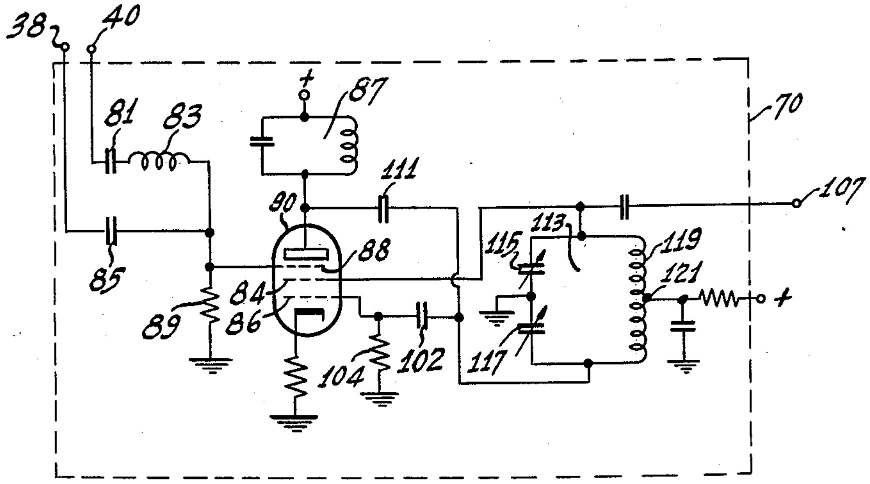
Figure 5 shows a schematic circuit showing an embodiment of the present invention which has increased phase stability.

Figure 5 shows a circuit which is an extension of the circuit shown in Figure 4; this circuit will provide teachings relating to injection-locking which will enhance and improve the operation of the burst multiplexed start-stop oscillator 70. The circuit shown in Figure 5 follows from the circuit shown in Figure 4 with the exception of the fact that the coupling condenser 111 provides the coupling path between the resonant circuit 87 to the grid circuit of the oscillator circuit. The oscillator circuit shown in Figure 5, however, differs from the oscillator circuit 93 shown in Figure 4 in that a very important principle which is well known in the art of injection-locking is employed.

Digressing for a moment from the principles involved in connection with the circuit shown in Figure 5, consider some aspects of an injection-locked oscillator. As is described in a comprehensive fashion by Robert Adler in his paper entitled "A Study of Locking Phenomena in Oscillators," as published in the Proceedings of the IRE for June 1946, an oscillator may be caused to oscillate at a frequency and phase of an injected oscillation signal provided that a condition for synchronization is adhered to. This condition for synchronization is expressed as follows:

$$\frac{E_1}{E} > \left|\frac{d\theta}{d\omega}\Delta\omega_0\right|$$

where $\omega_0$ is the free-running frequency, $\Delta\omega_0$ is the difference between the free-running frequency and the frequency of the synchronizing signal, $E_1$ is the voltage of the impressed signal injection in the grid circuit, E is the voltage induced in the grid circuit of the free-running oscillator by the feedback loop, $\omega$ is the instantaneous frequency of oscillation, and $\theta$ is the angle which represents the phase difference between the total voltage applied to the grid consisting of the feedback voltage which would normally be applied to the grid in vectorial summation with the injection voltage being delivered to the grid, to the feedback voltage itself.

Consider some aspects of the angle $\theta$ which are relative to the present discussion. Let $E_g$ be the vector sum total voltage developed from the grid to the cathode of an oscillator circuit. This total voltage in case of an injection-lock oscillator will consist of the vectorial sum of the injection voltage in the grid circuit and the voltage which is returned by coupling or any other method from the plate circuit to the grid circuit. The voltage E as previously described is designated as the voltage returned through the feedback circuit of the amplifier from the plate circuit to the grid circuit. Then with no external locking signal impressed, $E_g$ and E must coincide; that is, the voltage E return through the feedback path must have the same amplitude and phase as the voltage $E_g$ applied to the grid. Those non-linear elements which limit the oscillator amplitude will act to adjust the gain but the phase can only coincide at only one frequency, the free-running frequency $\omega_0$. At any other frequency the plate load will introduce phase shift between $E_g$ and E.

Figure 6:
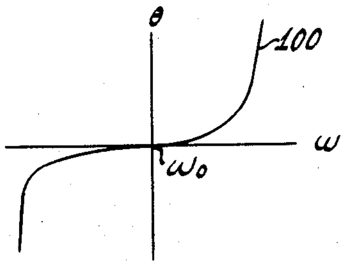
Figure 6 shows a frequency-versus-phase characteristic curve whose form is useful for providing increased phase stability in an oscillator circuit.

Figure 6 shows a typical curve of phase shift versus frequency for the type of tuned circuit 113 which is shown in Figure 5. The amount of lead or lag of the voltage drop across such a circuit with respect to the current flowing through it is plotted for the particular oscillator circuit being described, the curve may be assumed to represent the lead of the lag of E with respect to $E_g$ as a function of frequency. Now let the injection locking voltage $E_1$ be introduced. If $E_1$ is not in phase with E, the voltage returned through the feedback circuit will no longer be in phase with the grid voltage $E_g$ and E will lag behind $E_g$ by the phase angle $\theta$. No such lag could be produced if the oscillator were still operating at its free frequency $\omega_0$. One can therefore conclude that the frequency at this instant exceeds $\omega_0$ by an amount which will produce a lag equal to $\theta$ in the plate circuit. In like fashion it can be shown that in another range of operation E may be caused to lead $E_g$ by the phase angle $\theta$.

It then follows from the previously described condition for synchronization that if $\theta$ is caused to change very slowly with respect to $\omega$ in the vicinity of $\omega_0$ as shown in Figure 6, then the phase and frequency stability of the oscillator circuit subject to the injection-locking voltage $E_1$ will be considerably improved.

Applying these concepts to the circuits shown in Figure 5, the question then arises, what manner of tank or oscillatory circuit must be used as the combined tank and feedback circuit for the oscillator portion of the burst multiplexed start-stop oscillator 70. Note the nature of the tuned circuit 113. This tuned circuit 113 involves the use of an inductance 119 and a pair of series capacitors 115 and 117 whose midpoint is connected to ground. Note also that the mid terminal of the inductance 119 is by-passed to ground. Essentially speaking then the tuned circuit 113 is actually in one form a coupled circuit; coupled circuits are known to have phase versus frequency characteristics of the type shown in Figure 6, and by utilizing circuits frequency and phase stiffening of this type, the phase and frequency stability of the burst multiplexed start-stop oscillator 70 shown in Figure 5 may be considerably enhanced. The particular type of tank-feedback circuit 113 shown in Figure 5 offers the advantages in that not only does it offer the $\theta$ versus $\omega$ type of characteristcs necessary near the free-running angular frequency $\omega_0$ so as to add frequency and phase stability, but also the signal developed at one end of the tuned circuit, namely that applied to the screen grid 84 is 180° out of phase with the signal developed at the other end of the tuned circuit 113, namely that end of the tuned circuit 113 which is coupled to the control grid 86. Thus it is seen that two conditions are satisfied at the same time by the use of a resonant circuit having coupled circuit characteristics of the type shown as circuit 113 in Figure 5. First, the rate of change of $\theta$ as a function of frequency in the vicinity of the free-running frequency $\omega_0$ is very slow, thereby creating a condition through which the condition of synchronization which has been previously described in the equation can easily be realized. Secondly, the particular type of tank circuit involved permits the production of voltages which are substantially 180° out of phase so that this circuit may be used to provide the necessary feedback characteristics so that the system will function as an oscillator.

Figure 7:
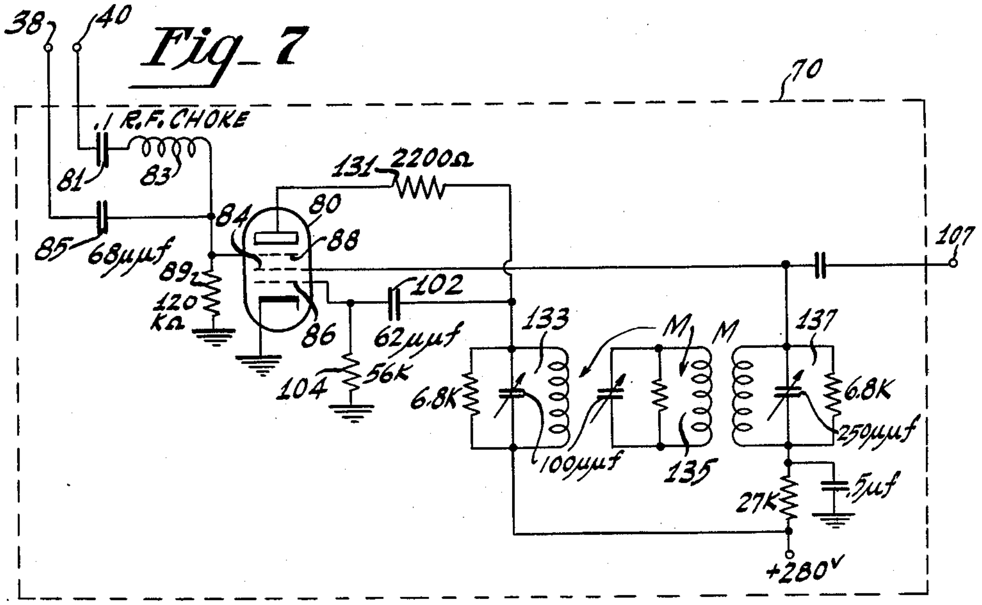
Figure 7 shows yet another embodiment of the present invention in which phase stability has been utilized.

Still a further extension of the circuitry of the burst multiplexed start-stop oscillator 70 based on principles which have been taught in connection with the need for reducing the slope of the curve for $\theta$ as a function of frequency in the vicinity of the free-running oscillator frequency $\omega_0$ involves the use of the triply tuned resonant circuits 133, 135, and 137 shown in Figure 7. It is to be noted that had a pair of separate inductively coupled circuits been used alone the substantially 180° phase shift necessary so that the circuit could be utilized for oscillator useage, could not have been easily realized. However, by using the triply tuned coupled tank circuit involving the resonant circuits 133, 135, and 137 the substantially 180° phase shift between grid voltage and screen grid voltage is accomplished in such a way that the oscillator action may be produced which is in no way at the expense of the ability to enhance the injection-locking characteristics of the oscillator portion of the burst multiplexed start-stop oscillator 70.

The concepts which apply to the frequency and phase stabilization of an injection-locked oscillator using coupled circuit techniques may be explained from an entirely different standpoint. The present invention can be thought of in terms of including the teaching that the oscillator frequency and phase drift be minimized before the oscillator is then subjected to techniques for frequency locking or automatic frequency control; this will ease the burden of the injection-locking and automatic frequency control system and indeed enhance the overall characteristics of the oscillator relative to its ability to be locked at the frequency and phase prescribed by the color synchronizing burst.

If only a minimizing of the frequency drift is desired, it is sometimes convenient to use an auxiliary resonant cavity which may be employed to provide certain oscillating systems with a certain amount of frequency and phase stiffness. One of the outstanding examples of resonant cavity stabilized systems is the stabilized magnetron oscillator which was described by Donal, Cuccia, Brown, Vogel, and Dodds, in their paper entitled "Stabilized Magnetron for Beacon Service" as published in the June 1947 issue of the RCA Review. In this magnetron oscillator system in which additional frequency and phase stiffness was required a high Q tunable cavity was inserted at the transmission line output of the magnetron so that the high Q tunable cavity became the reservoir of a certain percentage of the stored energy of the entire system. It was found that the frequency of the entire resonant system adhered closely to the frequency of the stabilizing resonator over a wide range of parameters which would normally have caused frequency and phase shift were the stabilizing resonator to be removed from the circuit.

A rewarding approach to the study of the problem is one based on stored energy and a stabilizing factor S which is defined as follows: $S$=the total stored energy in the system divided by the stored energy in the oscillator circuits.

This factor describes the ratio of the stored energy in the oscillator plus any stabilizing circuit element plus any attendant transmission line to the stored energy in the oscillator alone. The significance of the stabilizing factor S may be stated qualitatively as follows: the greater the proportion of the total system stored energy which is found in the stabilizing resonator, the greater will be the frequency stiffness of the oscillator. A mathematical description of the proof of this statement is presented by F. F. Rieke in the book by Collins entitled "Microwave Magnetrons" as published by the McGraw-Hill Book Co. in 1948.

Rieke derived the fact that as the stabilizing factor S is increased in magnitude, a shift in system frequency, as a function of a shift in oscillator frequency decreases at the same time, the shift in system frequency as a function of the stabilizing resonating frequency may be virtually a function of the stabilizing resonator frequency alone. In practical systems it is necessary to specify that S be somewhat smaller than 2 in order to prevent frequency instabilities during oscillation of the oscillator.

These teachings are readily applicable to the concepts which form the basis of the present invention with regard to improving the frequency and phase stability of the oscillator which is used in conjunction with the burst multiplexing system. It is seen that by using coupled circuit techniques which involve either a coupled circuit of the type shown in Figure 5 or Figure 7 the employment of the additional resonating elements which can be utilized for storing stored energy in a manner which can enhance the phase and frequency stability of the oscillator in its own right can then be utilized to improve the operation of the entire oscillator system which is caused to be responsive to the multiplexed color synchronizing burst. It is to be recognized in the circuits described in the specifications that the stabilizing circuits employed have permitted the function whereby the grid voltage is provided to the oscillator grid with this grid voltage being substantially 180° out of phase with respect to the voltage which is provided to the plate circuit of the oscillator.

Figure 8:
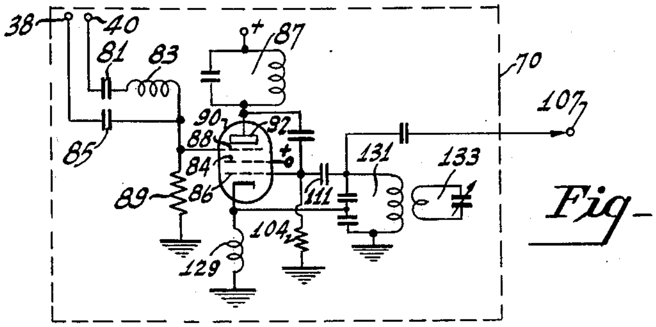
Figure 8 shows an embodiment of a phase stabilized color start-stop burst-multiplexed oscillator using a separate tuned circuit.

The teachings relating to phase and frequency stabilization of a color oscillator involving a separate coupled circuit are illustrated in Figure 8 where the burst multiplexed start-stop oscillator 70 is phase and frequency stabilized by the coupling of the resonant circuit 133 to the main oscillator tank circuit 131. By proper choice of the resonant frequency of the resonant circuit 131 and the coupling coefficient M, improved frequency and phase stabilization may be achieved.

Having described the invention, what is claimed is:

1. In combination in a color television receiver, a source of a color synchronizing signal, said color synchronizing signal characterized in that it is not continuous and that it has prescribed frequency and phase, a gating pulse generator including apparatus for producing gating pulses having duration intervals bearing a predetermined time relationship with regard to said color synchronizing signals, a combined switching and oscillator tube, said combined switching and oscillator tube including at least a first control grid, a screen grid and a switching grid and an output electrode, an oscillator circuit, means for coupling said oscillator circuit to said first control grid and said screen grid for developing oscillations in said oscillator circuit, a tuned network, said tuned network resonating at substantially the frequency of said color synchronizing signal, means for coupling said tuned network between said output electrode and said oscillator circuit, means for simultaneously coupling said signal and said gating pulses to said switching grid for causing said synchronizing signal to appear in said resonant network during the time interval prescribed by said gating pulses and to cause said oscillations to substantially cease during said gating pulses, means for adjusting said coupling between said resonant network and said oscillator network for causing said color synchronizing signal appearing in said resonant network to synchronize the frequency and phase of said oscillator circuit at a frequency and phase having a prescribed relationship with respect to the frequency and phase of said synchronizing signal when said oscillations resume after said gating pulses.

2. In combination, a source of a synchronizing signal, said synchronizing signal characterized in that it is not continuous and that it has prescribed frequency and phase, a gating pulse generator, said gating pulse generator including apparatus for producing gating pulses, said gating pulses having duration intervals bearing a predetermined time relationship with regard to said synchronizing signals, a combined switching and oscillator tube, said combined switching and oscillator tube including at least a first control grid, a screen grid and a switching grid and an output electrode, an oscillator circuit, means for coupling said oscillator circuit to said first control grid and said screen grid for developing oscillations in said oscillator circuit, a tuned network, said tuned network resonating at substantially the frequency of said synchronizing signal, means for switching said synchronizing signal into said tuned work during the time interval prescribed by said gating pulses, said switching means comprising means for applying both said signal and said gating pulses to said switching grid, means providing a coupling between said tuned network and said oscillator network for causing said synchronizing signal appearing in said tuned network to synchronize the frequency and phase of said oscillator circuit at a frequency and phase having a prescribed relationship with respect to the frequency and phase of said synchronizing signal, the magnitude and polarity of said gating pulses applied to said switching grid being such as to cause a substantial reduction in the level of oscillations developed in said oscillator circuit for the duration of each of said gating pulses.

3. The invention as set forth in claim 2 and wherein said oscillator circuit includes a phase and frequency stiffening circuit.

4. The invention as set forth in claim 2 and wherein said tuned network includes a ringing circuit and wherein said coupling between said tuned network and said oscillator circuit is provided through a piezo-electric crystal circuit, said piezo-electric crystal circuit having a resonant frequency at substantially that of said synchronizing signal.

5. In a color television receiver, said color television receiver adapted to receive a color television signal, said color television signal including a color synchronizing burst, said color synchronizing burst having predetermined phase and frequency characteristics, said color television receiver including a local color oscillator, means for synchronizing said local color oscillator at a phase and frequency determined by said color synchronizing burst comprising in combination, a gate pulse generator, said gate pulse generator including apparatus for providing a gate pulse, said gate pulse having a duration interval bearing a predetermined time relationship with respect to said color synchronizing burst, said local color oscillator including a multiplexing device, said multiplexing device having at least a first output electrode, a second output electrode, and a multiplexing electrode, and an oscillator circuit, said oscillator circuit coupled to said second electrode and caused to produce oscillation, a frequency and phase control circuit, said frequency and phase control circuit coupled between said first output electrode and said oscillator circuit, means for coupling said color television signal to said multiplexing device, means for applying said gating pulse to said multiplexing electrode to cause said oscillator circuit to be disabled during said pulse and whereby said color synchronizing burst is time multiplexed into said frequency and phase control circuit and utilized to cause said oscillator circuit to produce oscillations having said prescribed relationship with regard to the phase and frequency of said synchronizing signal when said oscillator becomes operative after said gate pulse.

6. In a color television receiver, said color television receiver adapted to receive a color television signal, said color television signal including a color synchronizing burst, said color synchronizing burst having predetermined phase and frequency characteristics, said color television receiver including a local color oscillator, means for synchronizing said local color oscillator at a phase and frequency determined by said color synchronizing burst comprising in combination, a gate pulse generator, said gate pulse generator including apparatus for providing a gate pulse, said gate pulse having a duration interval bearing a predetermined time relationship with respect to said color synchronizing burst, said local color oscillator including a multiplexing device, said multiplexing device having at least a first output electrode, a second output electrode, and a multiplexing electrode, and an oscillator circuit, said oscillator circuit coupled to said second electrode and caused to produce oscillation, a frequency and phase control circuit, said frequency and phase control circuit coupled between said first output electrode and said oscillator circuit, means for coupling said color television signal to said multiplexing device, means for applying said gating pulse to said multiplexing electrode whereby said color synchronizing burst is time multiplexed into said frequency and phase control circuit and utilized to cause said oscillator circuit to produce oscillations having said prescribed relationship with regard to the phase and frequency of said synchronizing signal, and whereby the level of said oscillations produced in said oscillator circuit is caused to fall below a predetermined level during the duration of said gate pulse.

7. In a color television receiver, said color television receiver adapted to receive a color television signal, said color television signal including a color synchronizing burst, said color synchronizing burst having predetermined phase and frequency characteristics, said color television receiver including a local color oscillator, means for synchronizing said local color oscillator at a phase and frequency determined by said color synchronizing burst comprising in combination, a gate pulse generator, said gate pulse generator including apparatus for providing a gate pulse, said gate pulse having a duration interval bearing a predetermined time relationship with respect to said color synchronizing burst, said local oscillator including at least a first output electrode, a second output electrode, a multiplexing electrode, and an oscillator circuit, said oscillator circuit coupled to said second electrode and caused to produce oscillations, a resonant circuit, said resonant circuit having a resonant frequency of substantially that of said color synchronizing burst, means for coupling said resonant circuit between said first output electrode and said oscillator circuit, means for applying said color television signal and said gate pulse to said multiplexing electrode to disable said oscillator circuit only during said gate pulse and to cause said color synchronizing burst to be time multiplexed into said resonant circuit and to develop oscillations in said resonant circuit, said coupling between said resonant circuit and said oscillator circuit connected whereby said oscillations produced in said resonant circuit are caused to injection-lock the frequency and phase of said local color oscillator when said oscillator becomes operative following said gate pulses.

8. In a color television receiver, said color television receiver adapted to receive a color television signal, said color television signal including a color synchronizing burst, said color synchronizing burst having predetermined phase and frequency characteristics, said color television receiver including a local color oscillator, means for synchronizing said local color oscillator at a phase and frequency determined by said color synchronizing burst comprising in combination, a gate pulse generator, said gate pulse generator including apparatus for providing a gate pulse, said gate pulse having a duration interval bearing a predetermined time relationship with respect to said color synchronizing burst, said local oscillator including at least a first output electrode, a second output electrode, a multiplexing electrode, and an oscillator circuit, said oscillator circuit coupled to said second electrode and caused to produce oscillations, a resonant circuit, said resonant circuit having a resonant frequency of substantially that of said color synchronizing burst, means for coupling said resonant circuit between said first output electrode and said oscillator circuit, means for applying said color television signal and said gate pulse to said multiplexing electrode whereby said color synchronizing burst is time multiplexed into said resonant circuit and caused to develop oscillations in said resonant circuit, said coupling between said resonant circuit and said oscillator circuit connected whereby said oscillations produced in said resonant circuit are caused to injection-lock the frequency and phase of said local color oscillator, and whereby the level of said oscillations produced in said oscillator circuit is caused to fall below a predetermined level during the duration of said gate pulse.

9. In a color television receiver, said color television receiver adapted to receive a color television signal, said color television signal including a color synchronizing burst, said color synchronizing burst having predetermined phase and frequency characteristics, said color television receiver including a local color oscillator, means for synchronizing said local color oscillator at a phase and frequency determined by said color synchronizing burst comprising in combination, a gate pulse generator, said gate pulse generator including apparatus for providing a gate pulse, said gate pulse having a duration interval bearing a predetermined time relationship with respect to said color synchronizing burst, said local color oscillator including a combination multiplexing and oscillator electron tube, said combination multiplexing and oscillator electron tube including at least a control grid, a first output electrode, a second output electrode and a multiplexing grid, said local color oscillator also including an oscillator circuit, said oscillator circuit coupled to said second output electrode and to said control grid of said multiplexing and oscillator electron tube, a resonant network, said resonant network having at least a resonant frequency substantially that of said color synchronizing burst, said resonant network coupled to said first output electrode, means for coupling said color television signal to said multiplexing grid, means for applying said gating pulse to said multiplexing and oscillator electron tube whereby said color synchronizing burst is multiplexed into said resonant network and whereby said oscillator circuit is disabled during said gating pulse, means for injecting the oscillations produced in said resonant network due to said color synchronizing burst into said oscillator circuit to cause said oscillator circuit to develop oscillations having said prescribed relationship with respect to the frequency and phase of said color synchronizing burst during a time interval following said gating pulse.

10. The invention as set forth in claim 9 and wherein said resonant network is a ringing circuit.

11. The invention as set forth in claim 9 and wherein said color synchronizing burst and said gating pulse are both applied to said multiplexing grid.

12. The invention as set forth in claim 9 and wherein said resonant network is coupled to said oscillator circuit through a piezo-electric crystal filter, said piezo-electric crystal filter having a predetermined bandwidth, said predetermined bandwith having a prescribed frequency relationship to the frequency of said color synchronizing burst.

13. The invention as set forth in claim 9 and wherein said oscillator circuit is characterized in that the phase angle between the voltage delivered to the control grid of the combination multiplexing and oscillator electron tube and the voltage which is the vector summation of the oscillations injected from said resonant network and said voltage delivered by said oscillator circuit to said control grid, has a predetermined waveform in the vicinity of the free-running frequency of said oscillator circuit working in conjunction with said combination multiplexing and oscillator electron tube.

14. The invention as set forth in claim 9 and wherein said resonant network includes a plate tank circuit, said plate tank circuit characterized in that it has the characteristics of a coupled circuit wherein stored energy caused to be stored in one or more portions of said coupled circuit causes substantial frequency and phase stabilization of said oscillator circuit operating in conjunction with said combination multiplexing and oscillator electron tube.

15. The invention as set forth in claim 9 and wherein said oscillator circuit is characterized in that it is a coupled circuit, said coupled circuit including coupled circuit elements whereby the voltage delivered to said first output electrode is substantially 180° out of phase with respect to said voltage delivered to said control grid and wherein the phase angle existing between the voltage delivered by said oscillator circuit to said control grid and the voltage which is a vectorial summation of this voltage delivered by said oscillator circuit to said control grid and the voltage injected by said resonant circuit into said oscillator circuit and therefrom developed at said control grid has a prescribed relationship with respect to frequency of oscillations in the vicinity of the free-running oscillator frequency of said oscillator circuit operating in conjunction with said combination multiplexing and oscillator electron tube.

16. In a color television receiver, the combination of, a source of an intermittent synchronizing signal having prescribed frequency and phase, a source of a multiplexing signal occurring in concidence with said synchronizing signal, a multiplexing tube, said multiplexing tube having at least a first output electrode, a second output electrode and a multiplexing electrode, a resonant circuit coupled to said second electrode and including means operating in conjunction with said multiplexing tube to produce oscillations, said resonant circuit including energy storage means inductively coupled to said resonant circuit for increasing the frequency stability of the oscillator circuit which includes said resonant circuit and said multiplexing tube, a frequency and phase control circuit, said frequency and phase control circuit coupled between said first output electrode and said resonant circuit, means for applying both said multiplexing signal and said synchronizing signal to said multiplexing electrode to time multiplex said synchronizing signal into said frequency and phase control circuit and to cause said oscillator circuit to cease oscillations during said multiplexing signal and to produce oscillations having a prescribed relationship with regard to the phase and frequency of said synchronizing signal during a time interval following said multiplexing signal.

17. In a color television receiver adapted to receive a composite color television signal including color synchronizing bursts which occur during each retrace interval and which have burst frequency and phase, a burst synchronized oscillator circuit comprising in combination: a multiplexing device having at least a first and second output electrode and a multiplexing electrode and operative to multiplex a signal applied to said multiplexing electrode to said first output electrode in response to a gating signal applied to said multiplexing device and also operative to produce oscillations in an oscillatory circuit coupled to said second output electrode, an oscillatory circuit having frequency determining elements resonant at the frequency of said bursts and coupled to said second output electrode to produce oscillations therein, said oscillatory circuit having a terminal point at which an applied signal having the frequency of said bursts and a prescribed phase will injection-lock the phase of said oscillations to a phase related to said prescribed phase, means to apply said composite color television signal to said multiplexing electrode, means to apply a gating signal having a duration interval substantially in coincidence with said bursts to said multiplexing device to cause said color synchronizing bursts to be developed at said first output electrode, a resonant circuit means resonant at the frequency of said bursts and coupled to said first output electrode and responsive to said bursts developed at said first output electrode to develop ringing oscillations having the frequency of said bursts and a phase related to the phase of said bursts, and means coupled between said resonant circuit means and said terminal point of said oscillatory circuit to apply said ringing oscillations to said terminal point whereby said ringing oscillations derived from said color synchronizing bursts are used to injection-lock the frequency and phase of said oscillations.

18. In a color television receiver adapted to receive a composite color television signal including color synchronizing bursts which occur during each retrace interval and which have prescribed frequency and phase, a burst synchronized oscillator circuit comprising in combination: a multiplexing device having at least a first and second output electrode, a multiplexing electrode and operative to multiplex a signal applied to said multiplexing electrode to said first output electrode in response to a gating signal applied to said multiplexing device and also operative to produce oscillations in an oscillatory circuit coupled to said second output electrode, an oscillatory circuit having frequency determining elements resonant at the frequency of said bursts and coupled to said second output electrode to produce oscillations therein, said oscillatory circuit having a terminal point at which an applied signal having the frequency of said bursts will injection-lock the frequency and phase of said oscillations to a frequency and phase prescribed by said bursts, means to apply said composite color television signal to said multiplexing electrode, means to apply a gating signal having a duration interval substantially in coincidence with said bursts to said multiplexing device to cause said color synchronizing bursts to be developed at said first output electrode, a first resonant circuit means resonant at the frequency of said bursts and coupled to said first output electrode and responsive to said bursts developed at said first output electrode to develop ringing oscillations having the frequency of said bursts and a phase related to the phase of said bursts, a second resonant circuit means having series resonance at the frequency of said bursts, means coupling said second resonant circuit means between said first resonant circuit means and said terminal point of said oscillatory circuit to filter said ringing oscillations having the frequency of said bursts and to apply said filtered ringing oscillations to said terminal point whereby said oscillatory circuit is caused to develop oscillations at a frequency and phase related to the frequency and phase of the ringing oscillations developed at said resonant circuit means.

References Cited in the file of this patent

UNITED STATES PATENTS

| | | |
|---|---|---|
| 2,594,380 | Barton | Apr. 29, 1952 |
| 2,653,187 | Luck | Sept. 22, 1953 |
| 2,740,046 | Tellier | Mar. 27, 1956 |

OTHER REFERENCES

Color Television, Rider Publication, pages 141 to 142, March 1954.